United States Patent
Zeldman et al.

[11] 3,878,734
[45] Apr. 22, 1975

[54] FLEXIBLE POWER TRANSMISSION BELT

[75] Inventors: Maurice Irving Zeldman; Joseph Stephen Burke; Richard Whittington Cadle, all of Pittsburgh, Pa.

[73] Assignee: North American Rockwell Corporation, Pittsburgh, Pa.

[22] Filed: Aug. 25, 1972

[21] Appl. No.: 283,918

[52] U.S. Cl............................... 74/229; 74/231 C
[51] Int. Cl............................................. F16h 7/00
[58] Field of Search......... 74/231 M, 231 P, 231 R, 74/237, 229, 233, 231 C

[56] References Cited
UNITED STATES PATENTS

| | | | |
|---|---|---|---|
| 2,466,495 | 4/1949 | Slemmons | 74/229 |
| 3,016,756 | 1/1962 | Jackel | 74/237 |
| 3,117,459 | 1/1964 | Schweitzer | 74/231 |
| D118,168 | 12/1939 | Nassimbene | 74/233 |

FOREIGN PATENTS OR APPLICATIONS

| | | | |
|---|---|---|---|
| 512,804 | 7/1952 | Canada | 74/229 |

*Primary Examiner*—Charles J. Myhre
*Assistant Examiner*—R. H. Lazarus

[57] ABSTRACT

A flexible power transmission belt is provided for transmitting power from a standard gear to at least one other standard gear comprising integrally formed flanged sides on one side thereof, enclosing therebetween a number of teeth adapted to mesh with the teeth of all of the gears, tensile members enclosed within the formed flanged sides and positioned at the pitch diameter of the teeth of all of the gears as the belt engages and meshes with the teeth of each of the gears, the depth of said teeth of said flexible powered transmission belt is equal to or greater than the depth of said formed flanged sides.

1 Claim, 5 Drawing Figures

PATENTED APR 22 1975 3,878,734

FLEXIBLE POWER TRANSMISSION BELT

BACKGROUND OF THE INVENTION

This invention relates to a flexible power transmission belt. In particular, the present invention relates to a flexible power transmission belt for transmitting power from a standard gear to at least one other standard gear comprising integrally formed flanged sides on one side thereof, enclosing therebetween a number of teeth adapted to mesh with the teeth of all of said gears, tensile members enclosed within said formed flanged sides and positioned at the pitch diameter of the teeth of all of said gears as said belt engages and meshes with the teeth of each of said gears, the depth of said teeth of said flexible powered transmission belt is equal to or greater than the depth of the formed flanged sides.

Belt drives as they are known in the power transmission industry have been used for a considerable period of time and are generally referred to as timing belts. Timing belts have been adapted to a myriad of applications but however are restricted in their scope and use. One form of restriction is that timing belts are adapted to work in conjunction with special belt pulleys and the like. Additionally, timing belts are typically offered only in standard lengths, that is, they are formed into continuous loops or belts. Additionally, timing belts and their corresponding specially adapted pulleys are available in limited pitch sizes.

There have been several attempts in the prior art to adapt flexible power transmission belts to "standard" gears but by their very nature they have been limited in a fashion similar to the above referenced timing belts. In particular, U.S. Pat. No. 3,117,459 to E. W. Schweitzer discloses a flexible transmission belt particularly adapted for coupling between a small pinion gear and a large gear or smooth drum.

The Schweitzer toothed transmission belt is inherently ineffective in that it will tend to bind upon engagement and disengagement of its mating gear. This will primarily be caused by its overhanging edge section means. Accordingly, the Schweitzer toothed transmission belt is capable of transmitting only very limited amounts and would be useful only in applications having low power requirements. Such applications alluded to by Schweitzer are, for example, instrument applications needing low noise levels for measuring small quantities.

SUMMARY OF THE INVENTION

Accordingly, it is an object of the present invention to provide a flexible power transmission belt for transmitting power from a standard gear to at least one other standard gear comprising integrally formed flanged sides on one side thereof, enclosing therebetween a number of teeth adapted to mesh with the teeth of all of the gears, tensile members enclosed within the formed flanged sides and positioned at the pitch diameter of the teeth of all of the gears as the belt engages and meshes with the teeth of each of the gears, the depth of said teeth of said flexible powered transmission belt is equal to or greater than the depth of said formed flanged sides.

It is another object of the present invention to provide highly efficient flexible power transmission belts capable of being inexpensively manufactured and being simplistic in design.

Another object of the present invention is to provide an improved flexible power transmission belt which can be manufactured using automated high volume techniques.

It is still another object of the present invention to provide a superior flexible power transmission belt which may be used to drive and be driven by standard "off the shelf" gears.

It is still another object of the present invention to provide a flexible power transmission belt that can be cut and joined to form endless belts of such dimensions as required by the user.

It is a further object of the present invention to provide a flexible power transmission belt having superior backlash characteristics and being capable of providing accurate timing in a particular gear train.

It is a still further object of the present invention to provide a low noise flexible power transmission belt.

Other objects and advantages of the invention will become apparent as the present invention is better understood from the following disclosure as shown in the accompanying drawings

DETAILED DESCRIPTION

Figure 1:
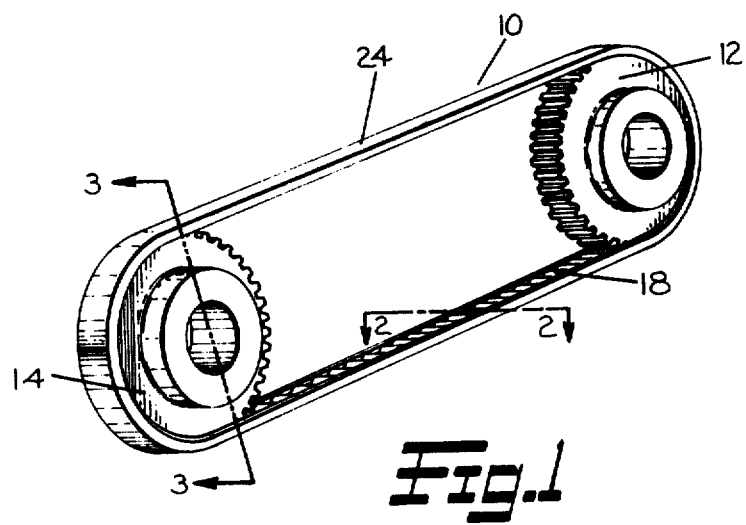
FIG. 1 is a perspective view showing the flexible power transmission belt of the present invention coupling one standard gear to another standard gear.
Figure 2:
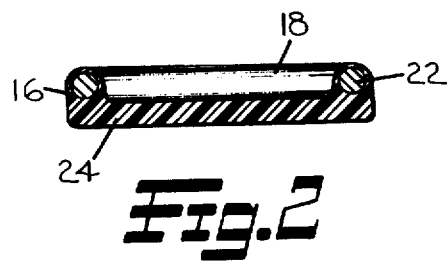
FIG. 2 is an enlarged sectional view of the flexible power transmission belt taken along line 2—2 of FIG. 1.
Figure 3:
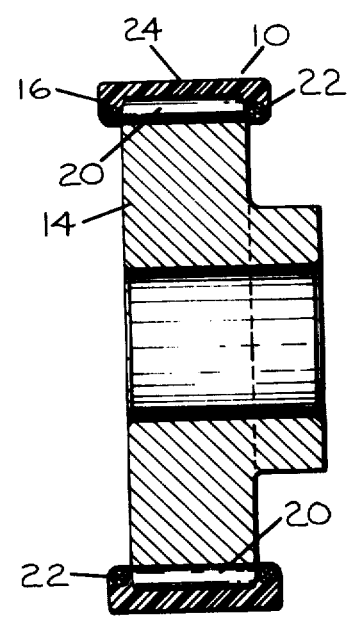
FIG. 3 is a sectional view taken along line 3—3 of FIG. 1.
Figure 4:
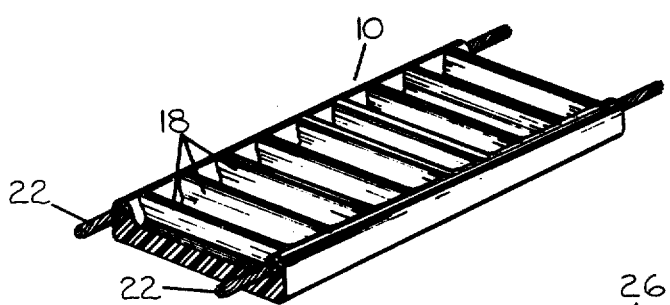
FIG. 4 is a perspective view of a section of the flexible power transmission belt of the present invention.

Referring now to the drawings, in particular FIGS. 1 through 4, there is shown an improved flexible power transmission belt 10. The flexible power transmission belt 10 is adapted for transmitting power from a standard gear 12 to a number of other standard gears such as gear 14. The flexible power transmission belt 10 includes integrally formed flanged slides 16. The formed flange side 16 encloses therebetween a number of teeth 18 which are adapted to mesh and couple with the teeth of gears 14 and 12 as for example gear teeth 20 of gear 14.

The flexible power transmission belt 10 is further provided with tensile members 22 which may be in the form of preformed wire rope. The tensile members 22 are enclosed within and encapsulated by the formed flanged sides 16. The tensile members 22 are positioned within each of the formed flanged sides 16 at the pitch diameter of the teeth of the gears 12 or 14 with which it is to mesh and couple.

The depth of each of the teeth 18 is equal to or greater than the depth of the formed flanged sides 16. This extremely important advance over the prior art enables the flexible powered transmission belt 10 to effectively engage and mesh with the teeth of gears 14 and 12. As for example gear teeth 20 of gear 14.

The flexible power transmission belt 10 is provided with a "cap" in that the side of the flexible power transmission belt 10 opposite the teeth is a smooth continuous imperforate surface 24. As the flexible power transmission belt 10 meshes with a gear, the cap or imperforate surface 24 acts as a dust shield. The overall section modulus of the flexible power transmission belt 10 is also increased by so providing such a continuous imperforate surface 24. Further, as the flexible power transmission belt 10 meshes and is coupled with a gear to transmit power thereby, the power is distributed over a number of teeth 18. Accordingly, each so engaged tooth 18 transmits only a fraction of the load.

The flexible power transmission belt can be joined at any length that may be desired by the ultimate user. This provides a flexible power transmission belt having greater versatility, offering substantial economies in production, distribution and warehousing. Many various approaches could be used to join the length of belt into a continuous flexible power transmission belt. For example, the elastomeric material could be stripped from one end of the flexible power transmission belt thereby exposing a section of the preformed wire ropes 22. The belt could then be cut to the desired length and the elastomeric material forming the belt could be likewise stripped off from the other end of the belt. The respective preformed wire ropes 22 could then be brought into engagement by looping the flexible power transmission belt 10 and could be interlocked by means such as welding or crimping or the like.

An example of the latter approach could include for example a cylindrical tube or casing adapted to engage the exposed ends of the preformed wire ropes 22. The sleeve could then be deformed about the wire thereby mechanically interlocking them and thus forming the flexible power transmission belt into a continuous belt. Addtionally, the flexible power transmission belt 10 could be formed initially into a continuous closed loop or belt. The belt could be provided with slotted portions in the formed flanged sides 16 (not shown). These grooves could be adapted to receive loops of preformed wire rope or the like. After such preformed wire ropes have been inserted into the preformed groove, the groove could then be closed by heat sealing or other plastic bonding methods. This approach would envison inserting a closed or continuous loop of preformed wire rope or the like into the preformed groove in the formed flanged side 16.

Figure 5:
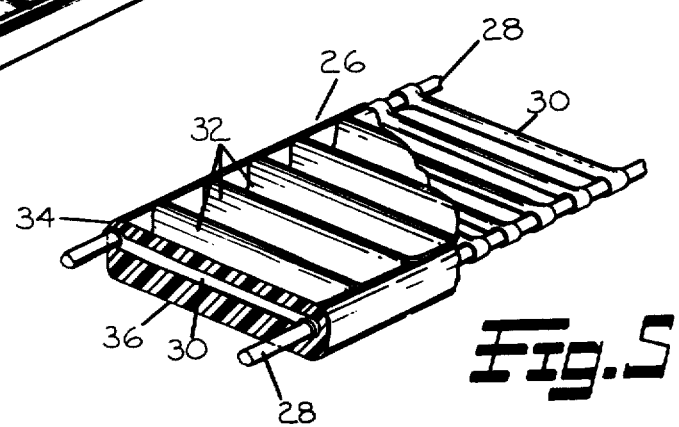
FIG. 5 is a perspective view of a section of another form of flexible power transmission belt of the present invention.

Another form of flexible power transmission belt 26 is shown in FIG 5. The flexible power transmission belt 26 is essentially the same as the flexible power transmission belt 10 except that its tensile members 28 are joined together at certain intervals by rung members 30. The rung members 30 effect a "ladder" type formation and may be spaced such that they are disposed in the teeth 32 of the flexible power transmission belt 26. The rung members 30 will thereby provide further strengthening means for the flexible power transmission belt 26 thereby increasing its power range applications.

Obviously, the flexible power transmission belt 10 or 26 could be manufactured by many suitable automated high volume techniques. One such approach may be by injection molding elastomeric material onto and encapsulating the preformed wire ropes 22 and 28 or rung members 30 as the case may be. The elastomeric material could form thereby the entire belt structure 10 or 26 including the teeth 18 and 32, the integrally flanged sides 16 and 34 and the continuous outer surface 24 and 36. The tensile members 22 and 28 could be held under tension in the mold as the elastomeric material is injected therein.

The preformed wire ropes 22 and 28 as well as the rung members 30 could be manufactured from a wide range of materials. The size of the rope, that is its diameter as well as the diameter of its individual strands, will depend upon the particular application involved. The tensile members 22 and 28 and rung members 30 could be manufactured from a number of materials as, for example, galvanized steel or stainless steel as well as polyester or nylon cord, glass yarn, or suitable combinations thereof. In addition to the above, additional suggested materials could include other types of fabrics, tapes and woven goods.

It should be noted that the tensile members 22 and 28 could take different forms. For example, linked chain could be used as tensile members and could be adapted to articulate as the power transmission belt meshes with a standard gear. Other flexible tensile members could likewise be used to serve the same purpose.

The tooth 18 or 32 of the flexible power transmission belt 10 and 26 respectively, could be manufactured from material different from the remaining portion of the flexible power transmission belt 10 and 26. For example, the respective teeth of the aforementioned flexible power transmission belts 10 and 26 could be manufactured from reinforced plastic, glass reinforced nylon having compressive and flexural strength of over 20,000 psi. Additionally, the teeth could be manufactured from a fairly stiff rubber or elastomer and encased in fabric. Further, a reinforced plastic tooth with a soft elastomeric coating could be utilized to improve the flexible power transmission belt's gear engagement qualities while at the same time improving the noise properties of the belt.

A preferred approach would be to utilize a fabric reinforcement throughout the belt onto which the teeth may be molded. Moldable elastomers that might be used in forming different portions of the belt 10 and 26 include TEXIN polyurethane (TEXIN, trademark of Mobay Chemical Company), HYTREL polyester (HYTREL, trademark of DuPont de Nemours), KRATON polystyrene-SBR (KRATON, trademark of Shell Oil Co.). The physical properties of these materials include superior resiliency, low heat buildup from mechanical hysteresis and oil, grease and abrasion resistance. Many rubber compounds could also be used to mold the flexible power transmission belt in accordance with the present invention. The rubber compounds that might be used include neoprene, butyl rubber, natural rubber, nitrile rubber and other such materials, including silicones, fluorocarbons, and the like.

Accordingly, there is thus provided a flexible power transmission belt which combines the advantages of timing belts with the utility, versatility and standardization and economy of standard "off the shelf" gears. The so provided flexible power transmission belt in accordance with the present invention will have many superior performance characteristics. For example, the flexible power transmission belt in accordance with the present invention will have positive slip proof engagement with respect to its mating standard gear; it will be substantially free from high tension; it will run at substantially constant angular velocity; it will have minimum backlash; it will provide a high degree of mechanical efficiency; it will be extremely quiet in operation;

and it will be particularly adapted to be used in a wide range of speeds and loads.

Obviously, the present invention is not limited to the specific details as herein described, but is capable of other modifications and changes without departing from the spirit and scope of the appended claims.

We claim:

1. A flexible power transmission belt in combination with transmitting power from a standard gear to at least one other standard gear comprising integrally formed flanged sides on one side thereof, enclosing therebetween a number of teeth adapted to mesh with the teeth of all of said gears, preformed wire rope enclosed within said formed flanged sides and positioned at the pitch diameter of the teeth of all of said gears as said belt engages and meshes with the teeth of each of said gears, the depth of said teeth of said flexible powered transmission belt is equal to or greater than the depth of said formed flanged sides, said teeth of said belt are reinforced plastic, said preformed wire rope is joined together at each tooth by wire rope rung members each said ring member being enclosed within each said tooth; the side of the belt opposite to said teeth of said belt is a smooth imperforate continuous surface, the depth of the teeth of said flexible power transmission belt are equal to the depth of the formed flanged sides.

* * * * *